United States Patent [19]

Takahashi et al.

[11] 4,323,431
[45] Apr. 6, 1982

[54] PURIFICATION OF COMPOUNDS HAVING HIGH MELTING POINT

[75] Inventors: Masatoshi Takahashi, Nishinomiya; Norio Kotera, Amagasaki; Masatoshi Uegaki, Nara; Takashi Miyaoka, Minoo; Yuzo Maegawa, Oita, all of Japan

[73] Assignee: Sumitomo Chemical Company Limited, Osaka, Japan

[21] Appl. No.: 175,082

[22] Filed: Aug. 4, 1980

[30] Foreign Application Priority Data

Aug. 6, 1979 [JP] Japan .............................. 54-100546

[51] Int. Cl.³ .................... B01D 1/22; B01D 3/10; C07C 97/24
[52] U.S. Cl. ..................................... 203/72; 203/87; 203/89; 203/91; 203/DIG. 25; 202/153; 202/176; 260/369; 260/378
[58] Field of Search ............... 260/369, 378; 203/91, 203/39, 72, 89, 87, DIG. 25; 202/205, 236, 153, 198, 176, 185 R, 186

[56] References Cited

U.S. PATENT DOCUMENTS

| | | | |
|---|---|---|---|
| 1,982,598 | 11/1934 | Sieck | 202/205 |
| 2,312,811 | 3/1943 | Gentil | 202/185 |
| 2,490,659 | 12/1949 | Snyder | 203/DIG. 1 |
| 2,645,661 | 7/1953 | Taylor et al. | 203/91 |
| 2,716,446 | 8/1955 | Ross | 202/205 |
| 2,887,441 | 5/1959 | Eriksson | 203/91 |
| 3,385,768 | 5/1968 | Yost | 202/205 |
| 4,009,188 | 2/1977 | Heim et al. | 203/72 |
| 4,141,799 | 2/1979 | Thelen et al. | 203/72 |
| 4,162,946 | 7/1979 | Thelen et al. | 203/72 |

FOREIGN PATENT DOCUMENTS 2532450 1/1977 Fed. Rep. of Germany ...... 260/369

Primary Examiner—Wilbur L. Bascomb, Jr.
Attorney, Agent, or Firm—Stevens, Davis, Miller & Mosher

[57] ABSTRACT

A high melting, high boiling organic compound is easily and stably purified by continuously supplying the molten organic compound to a rectification zone under a subatmospheric pressure and continuously distilling off and recovering vapors from the top of the rectification zone, while continuously withdrawing bottoms containing higher boiling impurities and/or involatile impurities than the desired compound from a reboiling zone at the bottom of the rectification zone to the outside of rectification system by means of a barometric leg, without any pretreatment of removing lower boiling impurities therefrom before the rectification, and without disturbing a pressure balance in the rectification system.

8 Claims, 2 Drawing Figures

PURIFICATION OF COMPOUNDS HAVING HIGH MELTING POINT

This invention relates to a process for purifying a high melting, high boiling organic compound by rectification.

Heretofore, processes for purifying high melting, high boiling organic compounds by sublimation, extraction, crystallization, etc. have been known, but these processes have so many problems regarding process economy and operability because of purification efficiency, applicable range, number of steps for treatment, etc., that they have not been regarded as practically advantageous processes.

On the other hand, rectification is the well known ordinary means for purification, and it is also known to apply the rectification to the purification of high melting, high boiling organic compounds.

Rectification of the high melting, high boiling organic compounds is usually carried out under a subatmospheric pressure, for example, 3–300 mmHg batchwise or continuously. However, even the commercially advantageous continuous rectification process still has operational and technical difficulties regarding continuous withdrawal of bottoms containing a larger amount of impurities than that of the desired compound from the rectification system without disturbing the pressure balance of the rectification system.

To solve these problems, a process which comprises withdrawing the bottoms from the subatmospheric rectification system to an atmospheric system outside the rectification system by means of a crystallizer screw has been proposed (Published Unexamined Japanese Patent Application No. 25547/1978). However, the process requires a strict temperature control and a high level technique in withdrawing the bottoms.

Under these situations, the present inventors have made extensive studies of processes for purifying high melting, high boiling organic compounds with an easy operability without the above-mentioned problems, and with a capability of continuously and stably withdrawing bottoms from the rectification system without disturbing the pressure balance of the system. As a result, the present inventors have found that these problems can be solved by utilizing a barometric leg, and have established the present invention.

The present invention provides a process for continuously purifying a crude high melting, high boiling organic compound, which comprises melting the crude organic compound, supplying the melt to a rectification zone kept under a subatmospheric pressure, condensing vapors distilled off from the top of the rectification zone to obtain a purified organic compound, and withdrawing bottoms containing higher boiling impurities and/or involatile impurities from a reboiling zone provided at the bottom of the rectification zone through a conduit connected to an outlet of the reboiling zone, the conduit being provided to establish a barometric leg.

High melting, high boiling organic compounds such as 1-aminoanthraquinone, 1-nitroanthraquinone, and anthraquinone are sensitive to heat, and their thermal decomposition rates are increased with increasing temperature in a molten state. Furthermore, the temperature of causing so vigorous thermal decomposition as to make a commercial operation substantially impossible is relatively near the melting point, and thus it is necessary from the viewpoint of apparatus and operation to provide a special technical means in addition to the above-mentioned stable withdrawal of bottoms. Examples of purification of such organic compounds by rectification are rare owing to the above-mentioned technical difficulties. One example is the process disclosed in the above-mentioned Japanese Patent Application No. 25547/1978, where all the distilled-off vapors from the rectification zone are condensed and liquefied in a total condensing zone, and the resulting condensate is to be divided into a portion to be returned to the rectification zone as a reflux and a portion to be discharged as the product. A crystallizer screw means must also be used for withdrawing the product from the rectification system. As a result, the condensate is inevitably retained at a higher temperature than the melting point for a much prolonged time. That is, the thermal decomposition or thermal deterioration of the organic compound is a serious problem.

In case where the desired compound is sublimable, the sublimated compound is liable to pass through the condenser to a down-stream part, and thus it is necessary to provide a trapping means in the down-stream part. In the trapping means, the sublimated compound is solidified and deposited onto a cooling surface of the trapping means by means of a low temperature cooling medium, and thus it is necessary to provide at least two trapping means to perform a continuous operation by switching of cooling and solidification of the sublimated compound to heating and melting of deposited compound one to another.

Furthermore, according to the above-mentioned process, higher boiling impurities than the desired high melting, high boiling compound are removed as bottoms, but lower boiling impurities than the desired compound are distilled off together with the desired compound, and all the amount of the lower boiling impurities are condensed together with the desired compound. Thus, a satisfactory purification effect can never be obtained without an additional purification pretreatment for removing the lower boiling impurities from the feed compound beforehand.

The present inventors have made further studies of solving these problems of purifying the distilled-off vapors containing lower boiling impurities, and have found that the purification of the distilled-off vapors can be carried out successfully in a very stable manner without the above-mentioned problems by leading the vapors distilled off from the rectification zone to a reflux condensing zone, thereby partially condensing the vapors, returning all the amount of the resulting condensate into the rectification zone as reflux, leading the remaining uncondensed vapors from the reflux condensing zone to a partial condensing zone, thereby partially or mostly condensing the remaining uncondensed vapors and continuously withdrawing the resulting condensate to the outside of the rectification system by means of a barometric leg.

Thus, the present invention also provides a process for continuously purifying a crude high melting, high boiling organic compound, which comprises melting the crude organic compound, supplying the melt to a rectification zone kept under a subatmospheric pressure, leading vapors distilled off from the top of the rectification zone to a reflux condensing zone provided to the top of the rectification zone, in which a part of the vapors is condensed to give a condensate, which is then fed into the rectification zone; leading remaining uncondensed vapors to a partial condensing zone connected to the reflux condensing zone, in which a part or most of the vapors is condensed to give a condensate of the purified compound, which is then taken out of the partial condensing zone to the outside of the rectification zone through a conduit connected to an outlet of the partial condensing zone, the conduit being provided to establish a barometric leg; leading further remaining uncondensed vapors containing lower boiling impurities to a vacuum rotary cooling zone or a total condensing zone; and withdrawing bottoms containing higher boiling impurities and/or involatile impurities from a reboiling zone provided at the bottom of the rectification zone through a conduit connected to an outlet of the reboiling zone, the conduit being provided to establish a barometric leg.

The present invention will be described in detail below, referring to the accompanying drawings.

First of all, description will be made of continuous withdrawal of bottoms and distilled condensate as a liquid from a subatmospheric pressure system to an atmospheric pressure system (in some cases, to a subatmospheric pressure system under a higher pressure than that of the rectification system), by means of a barometric leg, which is the most important feature of the present invention.

The vertical conduit connected to the bottoms-discharging outlet or the condensate-discharging outlet is not always a vertical one in a strict sense, but it is preferably a conduit as vertical as possible from the viewpoint of the shortest possible distance in height necessary for establishing a barometric leg.

Figure 1:
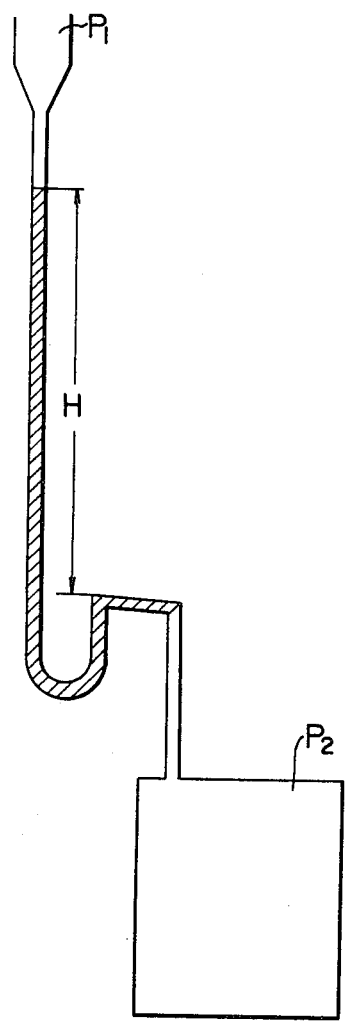
FIG. 1 is a schematic view of a device for continuously withdrawing a liquid by means of a barometric leg.

Shape of the vertical conduit is not particularly restricted, but usually preferable is a modified U-shaped tube shown in FIG. 1.

In FIG. 1, let the pressure in the rectification system $P_1$ [mmHg absolute], the pressure on the liquid withdrawal side $P_2$ [mmHg absolute], and the specific gravity of the liquid (molten) $\rho$ [g/cm$^3$]. Under a stationary condition, the height of a liquid column establishing the barometric leg on the rectification system side of the U-shaped tube, H [m], can be given by the following formula:

$$H = \frac{P_2 - P_1}{760} \times \frac{10.33}{\rho}$$

A pressure equilibrium is established at that height between both sides of the U-shaped tube. The liquid retained in the conduit can be made to flow toward the outlet side of the conduit only in such an amount as to correspond to the amount of the liquid newly added to the liquid column without using any special device for withdrawing the liquid, when the liquid is retained on the rectification system side of the conduit as a liquid column of the above-mentioned height H [m] establishing a barometric leg.

In that case, it is preferable to make the inner diameter of the conduit for withdrawing the liquid by means of the barometric leg as small as possible to make the residence time in the barometric leg section as short as possible, and also to control the temperature of a heating medium for the conduit above the melting point of the liquid but as close to the melting point as possible to prevent the reboiling of the liquid, that is, the bottoms or the condensate, at the upper part of the barometric leg.

According to the present invention, the vapors distilled off from the top of the rectification zone are led to a reflux condensing zone to partially condense the vapors, and all the amount of the resulting condensate is made to return into the rectification zone as a reflux, and the remaining uncondensed vapors are then led to a partial condensing zone.

In that case, it is necessary to circulate a cooling medium heated to a higher temperature than the melting point of the distilled-off vapors through the reflux condensing zone to prevent solidification of the vapors in the reflux condensing zone. The control of a refluxing rate usually depends upon the temperature of the cooling medium. For example, a refluxing rate is indirectly determined by temperatures of the cooling medium at the inlet and the outlet of the reflux condensing zone and the flow rate of the cooling medium. A reflux ratio, which is the ratio of the amount of partially condensed liquid by the reflux condensing zone as reflux and the amount of remaining uncondensed vapours from the reflux condensing zone is determined by conditions for separating the desired compound in connection with the number of theoretical plates of the rectification zone.

The remaining uncondensed vapors from the reflux condensing zone are then led to the partial condensing zone to partially or mostly condense the vapors. The resulting condensate is made to flow down through a vertical conduit connected to the condensate-discharging outlet of the partial condensing zone, by means of a barometric leg, and is continuously withdrawn to the outside of the rectification system. The condensate discharged to the outside of the rectification system is solidified and pelletized by a horizontal belt-type flaking means or a drum-type flaking means, or the like, and is recovered as a product. In that case, a partial condensation ratio, which is the ratio of amount of partially condensed liquid in the partial condensing zone and the amount of the uncondensed vapors from the partial condensing zone is determined by the percentage of lower boiling impurities than the desired compound in the total distallate and the allowable limit of the lower boiling impurities in a product required for a high purity. As to the cooling medium for the partial condensing zone, a cooling medium heated to a higher temperature than the melting point of the condensate is used in the same manner as in the case of the reflux condensing zone, and control of the partial condensation ratio is carried out in the same manner as in the case of the reflux condensing zone as to the control of the reflux ratio.

On the other hand, the remaining uncondensed vapors containing a large amount of lower boiling impurities from the partial condensing zone are further led to a vacuum rotary cooling means continuously operated in a vacuum system to conduct direct solidification and pelletization of the vapors, or to a total condensing zone, to conduct total condensation, and the resulting condensate is withdrawn from the total condensing zone in the same manner as in the case of the partial condensing zone. However, it is preferable to use the vacuum rotary cooling means. In that case, it is important that the solidified or pelletized mass from the vacuum rotary cooling means is accumulated in one of the storage tanks, and the solidified or pelletized mass is discharged from the storage tanks periodically by switching one to another, thereby recovering the ultimate distallate mass. Thus, it becomes unnecessary to provide a plurality of trapping means and make alternate operation of the trapping means. The present process is more simplified in process steps and operation.

In order to carry out the present process in a commercially advantageous scale, a high melting, high boiling organic compound to be fed to the rectification system must be melted into a liquid in advance. It is preferable to continuously supply the organic compound in a powdery or granular state including a flaky state to a melting tank of agitated type directly, or in some cases, after having been preheated nearly to the melting point through a screw feeder-type preheater succeeded by the melting tank where it is continuously melted. By means of the above mentioned method the organic compound to be purified can be melted in a short time while suppressing thermal deterioration.

The type of rectification column for the rectification zone is not particularly restricted in the present invention and rectification columns of so far well known types can be used, where the necessary number of theoretical plates can be selected in consideration of the kinds, contents, etc. of the impurities contained in the organic compound to be fed to the rectification system.

The type of reboiler for the reboiling zone to be provided at the bottom of the rectification zone is, likewise, not particularly restricted in the present invention, but it is more effective to use a reboiler of thin film evaporator type. It is preferable to supply the feed organic compound directly to the reboiling zone or to a space above the stripping section of the rectification zone.

The present invention is suitable for purifying high melting organic compounds having a melting point of about 100° to 350° C., and a very remarkable effect can be obtained particularly when organic compounds having a melting point of 200° to 300° C. are purified according to the present invention. High melting, high boiling organic compounds suitable for purification according to the present invention are anthraquinones including, for example, anthraquinone, 1-aminoanthraquinone, 1-nitroanthraquinone, etc. Particularly, 1-aminoanthraquinone can be advantageously separated from crude 1-aminoanthraquinone containing anthraquinone, 2-aminoanthraquinone, diaminoanathraquinones, etc. by rectification according to the present invention.

In order to suppress the thermal deterioration of the desired high melting, high boiling organic compound, it is preferable in the present invention to make the capacities of the individual apparatuses as small as possible, make the layout of connecting pipings as short and simple as possible, thereby making the residence time as short as possible in the rectification system at an elevated temperature.

Figure 2:
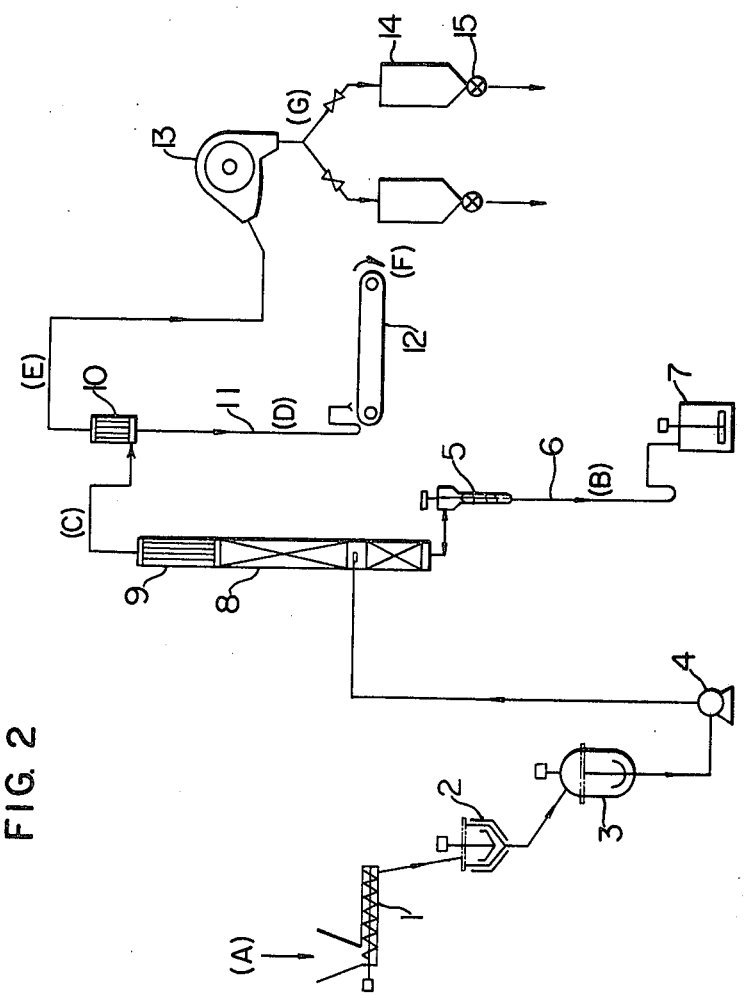
FIG. 2 is a typical flow diagram showing one embodiment according to the present invention.

A typical embodiment of the present invention will be described in detail below, referring to FIG. 2.

A high melting, high boiling organic compound (A) to be purified in a powdery state or a granular state including a flaky state is continuously supplied at a constant rate to a preheating screw feeder 1 to preheat the organic compound to a temperature near the melting point of the organic compound, and thereafter supplied to a melting tank 2 of continuously agitated type. The melting tank is provided with a jacket and a heating coil inside the tank, through which a heating medium is circulated to give the necessary heat for melting the organic compound. The organic compound in the tank is continuously stirred, and only the molten feed in a liquid state is allowed to flow into a receptacle 3 through a screw device which is provided at the bottom of the melting tank and coupled with the stirrer shaft of the tank. It is preferable to make the capacity of the receptacle 3 operably as small as possible and make stirring in the receptacle 3.

Thereafter, the molten organic compound is continuously supplied from the receptacle 3 to a rectification column 8 at a constant rate by a feed pump 4. The feed pump 4 has a jacket for completely heat insulating the pump body, and is made from a heat-resisting material in a heat-resisting structure. The preferable type of the feed pump 4 is a gear pump or a screw pump or a plunger pump, because the molten organic compound must be supplied to the rectification column 8 at a constant rate.

Particularly preferable type of a reboiler for the rectification column is a thin film evaporator 5, as already mentioned before, because the possibly largest reduction in the residence time can be attained therein, and it is further preferable that the thin film evaporator is provided with stirring blades which can rotate so as to scrape the inside wall surface of the thin film evaporator. The stirring blades can bring the molten organic compound into a thin film form on the heated wall surface of the thin film evaporator, and can also improve heat transfer efficiency between the evaporator and the molten organic compound.

The bottoms (B) containing a large amount of higher boiling impurities, which is discharged from the thin film evaporator, is made to flow down through a bottoms-withdrawing conduit 6 connected to the bottoms-discharging outlet of the evaporator by means of a barometric leg through the conduit and continuously withdrawn to the atmospheric pressure side.

The height of the conduit 6 (which corresponds to H in FIG. 1) can be varied by the degree of pressure reduction in the rectification system, the specific gravity of bottoms, etc., but it is usually set to at least 10 m. In that case, the height of the liquid column can be shortened, for example, by reducing the pressure of a receptacle for the withdrawn bottoms at the bottom of the conduit, as shown in FIG. 1, even where such relationship as $P_2 > P_1$ must, however, be attained.

The continuously withdrawn bottoms can be then treated as desired, for example, by discharging the withdrawn bottoms into a cooling water tank 7 of agitated type to make dispersion and solidification, or by introducing the bottoms directly into a small receptacle to make air cooling and solidification, or by placing the bottoms onto a horizontal belt-type flaker to make solidification and pelletizing.

The vapors generated in the thin film evaporator 5 are made to pass upwardly through the rectification column 8. Since the rectification is directed to the high boiling organic compound, it is necessary to maintain a relatively high reduction in pressure, usually 3–300 mmHg absolute, preferably 10–25 mmHg absolute, inside the rectification system. However, the pressure inside the rectification system must be higher than the saturated vapor pressure of the feed organic compound at its melting point.

Thus, it is preferable to use a rectification column of packed type as the rectification column 8, in which packing material of low pressure drop is filled. Furthermore, since the rectification column is exposed to high temperature, it is desirable to use packing material made from heat-resisting material, preferably metallic material, particularly stainless steel. The necessary height of the rectification column 8 depends upon the desired degree of purification of the desired organic compound, but it is preferable to use a rectification column of small pressure drop in the case of a large number of the necessary theoretical plates. Furthermore, in order to completely prevent heat loss from the side wall of rectification column 8 to avoid condensation of vapors and solid formation on the inside wall surface of the column, it is necessary to thoroughly insulate the outside wall of the column with a thermally insulating material or preferably provide the entire outside wall surface of the column with a jacket and circulate a heating medium controlled to a temperature substantially equal to the inside temperature of the column to effect forced heat insulation.

The vapors leaving the top of the rectification column 8 are partially condensed in a reflux condenser 9 provided at the top of the rectification column, and the resulting condensate is returned to the rectification column as a reflux.

Uncondensed vapors (C) leaving the reflux condenser 9 are led to a partial condenser 10, where the vapors are partially or mostly condensed. The resulting condensate (D) is continuously withdrawn to the outside of the rectification system by means of a barometric leg 11, and then solidified and pelletized as a product (F) by a flaker 12, as already described before.

Uncondensed vapors (E) containing a large amount of lower boiling impurities, which leave the partial condenser 10, are led to a vacuum rotary cooler 13 operated under the same subatmospheric pressure as in the rectification system, and cooled and solidified on a cooling drum rotating at a low speed, usually 2-10 rpm. The solidified mass deposited in a film state on the cooling drum surface is scraped off therefrom by a scraper, and pelletized into flakes at the same time. The pelletized solid mass (G) is accumulated into a storage tank 14 provided under the vacuum rotary cooler 13. Usually, at least two storage tanks are provided in parallel, and alternately used by switching one to another. It is preferable that the storage tanks 14 have a conical bottom so that the pelletized solid mass can be smoothly discharged therefrom. When the accumulated solid mass is discharged from the storage tank, the subatmospheric inside pressure of the storage tank is returned to the atmospheric pressure, and then the solid mass is discharged from the storage tank through a rotary valve 15 provided at the bottom of the storage tank 14. In that case, it is effective to provide the vacuum rotary cooler 13 succeeded by equipment thereto in a plurality of series.

Partial condensation in the partial condenser 10 is directed to separation of lower boiling impurities in the feed organic compound, and thus when practically no lower boiling impurities than the desired compound are contained in the feed or when strict separation of the lower boiling impurities from the organic compound, though contained therein, is not necessary to conduct on account of the permissible limit of the impurities in a product, the partial condensation is not necessary to carry out. That is, total condensation can be carried out in the condenser 10, and the resulting condensate can be withdrawn to the outside of the rectification system, by means of the barometric leg, as described before. As an alternative, the uncondensed vapors from the reflux condenser 9 can be directly led to the vacuum rotary cooler 13 without passing the vapors through the condenser 10 to obtain a product. These modes of operation are included in the present invention as embodiments of the present invention.

In the rectification system according to the present invention, it is preferable that all of the apparatuses, conduits, and other accessories for handling the molten feed are provided with jackets for keeping these items at a higher temperature than the melting point of the feed organic compound and a high temperature heating medium is circulated through the jackets to heat these items, because of the high melting point of the handled organic compound. As to the rectification column proper, all of the heating medium used for preheating it before the start of rectification operation can be withdrawn from the jacket after preheating where thermal insulation of the rectification column from the surrounding atmosphere can be attained only by a thermally insulating material provided around the jacket of the recification column.

According to the present invention, high melting, high boiling compounds, whose purification has been so far regarded as very difficult, can be purified by rectification without any pretreatment of removing the lower boiling impurities from the feed organic compound beforehand, and the respective components can be continuously withdrawn easily in a stable manner from the rectification system without disturbing the pressure balance of the rectification system. Thus, the purification can be carried out commercially very advantageously in the present invention.

The present invention will be described in detail below, referring to Examples, which are merely illustrative but not restrictive of the present invention.

EXAMPLE 1

A mixture of aminoanthraquinones having the following composition was continuously supplied to a melting tank 2 of agitated type at a feed rate of 10 kg/hr, and melted.

| | |
|---|---|
| Anthraquinone | 1.4% by weight |
| 1-Aminoanthraquinone | 75.2% by weight |
| 2-Aminoanthraquinone | 1.0% by weight |
| 1,5-Diaminoanthraquinone | 6.0% by weight |
| 1,8-Diaminoanthraquinone | 4.8% by weight |
| Other Diaminoanthraquinones | 8.7% by weight |
| Unknowns | 2.9% by weight |

The molten mixture was supplied to the lowest part of a rectification column 8 by means of a feed pump 4, and partially evaporated together with a return liquid from the rectification column 8 in a thin film evaporator 5 connected to the bottom of the rectification column 8. Bottoms having the following composition was continuously withdrawn from the bottom of the thin film evaporator 5 to the atmosphere at a discharge rate of 2.9 kg/hr by means of a barometric leg through a vertical conduit connected to the bottom of the thin film evaporator, led to a cooling water tank 7 of agitated type whose water surface was kept in a thoroughly agitated state, and solidified into particles suspended in water.

| | |
|---|---|
| 1-Aminoanthraquinone | 14.6% by weight |
| 2-Aminoanthraquinone | 1.7% by weight |

-continued

| | |
|---|---|
| 1,5-Diaminoanthraquinone | 20.5% by weight |
| 1,8-Diaminoanthraquinone | 16.3% by weight |
| Other diaminoanthraquinone | 29.5% by weight |
| Unknowns and thermally deteriorated products | 17.4% by weight |

Column top pressure was 15 mmHg absolute, and heating temperature of the thin film evaporator 5 was 330° C.

The vapors generated in the thin film evaporator 5 was rectified in the rectification column 8. The rectification column was filled with packing material of low pressure drop up to a height of 3.0 m and had a distillation efficiency of about 10 theoretical plates. A jacket was provided around the outside surface of the column to effect forced thermal insulation by circulating a heating medium through the jacket.

Column top temperature was 275° C., and a heating medium at 255° C. was passed through a reflux condenser 9 to partially condense the vapors distilled off from the top of the rectification column and return the resulting condensate to the rectification column as a reflux. An estimated reflux ratio was 1.5/1.0.

The vapors leaving the reflux condenser 9 were further partially condensed in a partial condenser 10 by passing a heating medium at 255° C. therethrough. The resulting partial condensate having the following composition was continuously withdrawn to the atmosphere at a discharge rate of 3.7 kg/hr by means of a barometric leg, and recovered by solidification and pelletization by a horizontal belt-type flaker 12.

| | |
|---|---|
| Anthraquinone | 0.8% by weight |
| 1-Aminoanthraquinone | 98.2% by weight |
| 2-Aminoanthraquinone | 1.0% by weight |
| Diaminoanthraquinones | Substantially zero |

Uncondensed vapors from the partial condenser 10 were led to a vacuum rotary cooler 13, and finally a solified powdery mass having the following composition was obtained at an average discharge rate of 3.4 kg/hr by passing cold water at 20° C. through the cooling drum of the vacuum rotary cooler.

| | |
|---|---|
| Anthraquinone | 3.1% by weight |
| 1-Aminoanthraquinone | 96.6% by weight |
| 2-Aminoanthraquinone | 0.3% by weight |
| Diaminoanthraquinones | Substantially zero |

Throughout the rectification system, the parts through which the molten mixture was passed were thermally insulated by passing a heating medium at 285° C. or higher through the jackets around these parts.

EXAMPLE 2

A mixture of anthraquinones having the following composition was continuously supplied to a preheating screw feeder 1 at a feed rate of 12 kg/hr, preheated to 200° C., thereafter continuously supplied to a melting tank 2 of agitated type, and melted.

| | |
|---|---|
| Anthraquinone | 2.0% by weight |
| 1-Aminoanthraquinone | 75.9% by weight |
| 2-Aminoanthraquinone | 3.2% by weight |
| 1,5-Diaminoanthraquinone | 4.4% by weight |
| 1,8-Diaminoanthraquinone | 3.3% by weight |
| Other diaminoanthraquinones | 8.1% by weight |
| Unknowns | 3.1% by weight |

The molten mixture was supplied from a melting receptacle 3 to the lower part of a rectification column 8 by means of a feed pump 4 and partially evaporated together with the return liquid from the rectification column 8 in the thin film evaporator 5 connected to the bottom of the rectification column 8. Bottoms having the following composition was continuously withdrawn from the bottom of the thin film evaporator 5 to the atmosphere at a discharge rate of 3.9 kg/hr by means of a barometric leg in the vertical conduit connected to the bottom of the thin film evaporator, led to a cooling water tank 7 whose water surface was kept in a thoroughly stirred state, and solidified into particles suspended in water in the same manner as in Example 1.

| | |
|---|---|
| 1-Aminoanthraquinone | 22.5% by weight |
| 2-Aminoanthraquinone | 7.1% by weight |
| 1,5-Diaminoanthraquinone | 12.9% by weight |
| 1,8-Diaminoanthraquinone | 9.7% by weight |
| Other diaminoanthraquinones | 23.7% by weight |
| Unknowns and thermally deteriorated products | 24.1% by weight |

Column top pressure was 10 mmHg absolute, and the heating temperature of the thin film evaporator 5 was 320° C.

The vapors generated in the film evaporator 5 were rectified in the rectification column 8. The rectification column was likewise filled with paking material of low pressure drop up to a height of 2.0 m in the enriching section and up to a height of 1.0 m in the stripping section. The estimated number of theoretical plate was 6 for the enriching section and 2 for the stripping section. The column was likewise provided with a jacket around the outside surface of the column to effect forced thermal insulation by a heating medium.

Column top temperature was 266° C., and the vapors distilled off from the rectification column was partially condensed in a reflux condenser 9 by passing a heating medium at 252° C., and the resulting condensate was returned to the rectification column as a reflux. Estimated reflux ratio was 1.0/1.0.

All the amount of the vapors leaving the reflux condenser 9 was led directly to a vacuum rotary cooler 13 and cooled by passing hot water at 70° C. through the cooling drum of the vacuum rotary cooler, whereby a solidified powdery mass having the following composition was obtained at an average discharge rate of 8.1 kg/hr.

| | |
|---|---|
| Anthraquinone | 2.8% by weight |
| 1-Aminoanthraquinone | 96.2% by weight |
| 2-Aminoanthraquinone | 1.0% by weight |
| Diaminoanthraquinones | Substantially zero |

Throughout the rectification system, the parts through which the molten mixture was passed were thermally insulated by passing a heating medium at 285° C. or higher through the jackets around these parts.

What is claimed is:

1. A process for continuously purifying a crude, high melting, high boiling organic compound, which comprises:

(a) melting the crude organic compound;

(b) supplying the melt to a rectification zone kept under a subatmospheric pressure;

(c) partially condensing vapors distilled off from the top of the rectification zone by leading the vapors to a first partial condensation zone provided at the top of said rectification zone, the partial condensate being fed into the rectification zone as a reflux;

(d) further partially condensing the remaining vapors after said partial condensation in step (c) by leading said remaining vapors to a second partial condensation zone connected to said first partial condensation zone, thereby obtaining a second partial condensate which is a purified organic product;

(e) withdrawing said purified product to the outside of said rectification zone through a conduit establishing a first barometric leg;

(f) finally cooling the remaining uncondensed vapor in a vacuum rotary cooling zone or a total condensing zone; and (g) withdrawing a liquid bottoms product containing at least one of higher boiling impurities and involatile impurities from a thin film evaporator with stirring blades provided at the bottom of the rectification zone through a conduit establishing a second barometric leg.

2. The process according to claim 1, wherein the melting is carried out by feeding the crude organic compound in a powdery or granular form, said feed being optionally pre-heated nearly to the melting point of the organic compound, into a melting zone, and melting the same therein, and the supplying is carried out by passing the melt through pumping means kept at a temperature not lower than the melting point of the organic compound.

3. The process according to claim 1, wherein the high melting, high boiling organic compound has a melting point of 200° to 300° C.

4. The process according to claim 3, wherein the high melting, high boiling organic compound is anthraquinone or its derivative.

5. The process according to claim 1, wherein the rectification zone is kept under a pressure of 3–300 mmHg absolute.

6. The process of claim 2, wherein said pumping means is a gear pump.

7. The process of claim 2, wherein said pumping means is a screw pump.

8. The process of claim 2, wherein said pumping means is a plunger pump.

* * * * *